United States Patent [19]
Lansbergen et al.

[11] Patent Number: 5,888,575
[45] Date of Patent: Mar. 30, 1999

[54] TRIGLYCERIDE FAT CRYSTALLIZATION

[75] Inventors: Gabriel Jacobus Lansbergen; Cornelis Laurentius Sassen, both of Vlaardingen, Netherlands; John Schuurman, Baltimore, Md.

[73] Assignee: Lipton, Division of Conopco, Inc., Englewood Cliffs, N.J.

[21] Appl. No.: 965,520

[22] Filed: Nov. 6, 1997

[30] Foreign Application Priority Data

Nov. 6, 1996 [EP] European Pat. Off. ............... 96203096

[51] Int. Cl.$^6$ ....................................................... A23D 9/00
[52] U.S. Cl. .......................... 426/610; 426/607; 426/608; 554/2
[58] Field of Search ..................................... 426/607, 608, 426/610; 554/2

[56] References Cited

U.S. PATENT DOCUMENTS

| | | |
|---|---|---|
| 5,188,858 | 2/1993 | Stipp et al. . |
| 5,258,197 | 11/1993 | Wheeler et al. . |
| 5,407,695 | 4/1995 | Wheeler et al. . |
| 5,470,598 | 11/1995 | Scavone .................................. 426/607 |
| 5,492,714 | 2/1996 | Guskey .................................... 426/607 |
| 5,554,408 | 9/1996 | Cain ......................................... 426/607 |
| 5,576,045 | 11/1996 | Cain ......................................... 426/607 |
| 5,589,216 | 12/1996 | Guskey .................................... 426/607 |
| 5,662,953 | 9/1997 | Wheeler .................................. 426/607 |
| 5,681,608 | 10/1997 | Cain ......................................... 426/607 |

FOREIGN PATENT DOCUMENTS

| | | |
|---|---|---|
| 0074146 | 3/1983 | European Pat. Off. . |
| 93/15612 | 8/1993 | WIPO . |
| 94/19961 | 9/1994 | WIPO . |
| 95/30336 | 11/1995 | WIPO . |

OTHER PUBLICATIONS

European Search Report, Application No. EP 96 20 3096 dated Apr. 21, 1997.

*Primary Examiner*—Carolyn Paden
*Attorney, Agent, or Firm*—Matthew Boxer

[57] ABSTRACT

Saturated triglycerides which have a big difference in chain length between the longest and the shortest fatty acid chain and which are able, when incorporated in a small amount into a slow crystallizing fat, particularly a low-trans fat, to increase considerably the speed of crystallization.

9 Claims, 2 Drawing Sheets

TRIGLYCERIDE FAT CRYSTALLIZATION

The present invention is concerned with triglyceride fats which show improved crystallization behaviour.

BACKGROUND OF THE INVENTION

Triglyceride fats are usually processed in a liquid condition. For the production of spreads, and other W/O emulsions such as margarine, the liquid oils are mixed with an aqueous phase and emulsified until a proper consistency is obtained. For obtaining a proper consistency a part of the liquid fat needs to solidify by crystallization. Depending on the type of fat the crystallization process proceeds more or less quickly. Depending on the speed of crystallization the final firmness of the spread has not yet be attained when it arrives at the packing station. Problems with wrapping are encountered and during subsequent storage and transportation.

Certain types of fat presently used for spread manufacture exhibit slow crystallization behaviour, typically when the content of trans fatty acids is low. The speed of crystallization may be increased by the addition of a relatively small amount of crystallization accelerator. Such crystallization accelerator preferably is also a triglyceride fat but having a different composition. The crystallization accelerators disclosed in for example EP 0 498 487 are PEP triglycerides having saturated (palmitic) 1,3-chains and a 2-trans-unsaturated (elaidic) acyl group.

The use of low-trans or trans-free oils in food preparation have shown a rapid expanse in recent times. Finding a solution for the inherent crystallization problems have become an urgent issue. A need has risen for further crystallization accelerators which are effective but which have the same low trans content as the oils in which they are applied.

BRIEF SUMMARY OF THE INVENTION

A crystallization accelerator has been found which is a triglyceride fat having carbon chains of different chain lengths, of which saturated chains with C>15 are denoted as X and the saturated chains with C<15 as M. The fat should contain an effective amount of triglycerides of the type XXM and XMX (together denoted as X2M) which are able to accelerate the crystallization of slow crystallizing fats. A condition is that when the weight ratio of XXM and XMX triglycerides (XXM/XMX) is at least 2.5, the X2M triglycerides have a longest carbon chain which differs from the shortest chain by at least two carbon atoms and when XXM/XMX is <2.5, the X2M triglycerides have a longest carbon chain which differs from the shortest chain by at least six carbon atoms.

The effective amount of X2M triglycerides is at least 10 wt. % of the accelerator fat when XXM/XMX is <2.5, but for XXM/XMX being at least 2.5 the effective amount of said triglycerides should be at least 15 wt. % of the accelerator fat.

The invention comprises slow crystallizing triglyceride fats blended with such crystallization accelerator and a method for accelerating fat crystallization using such triglycerides.

DETAILS DESCRIPTION OF THE INVENTION

Figure 1:
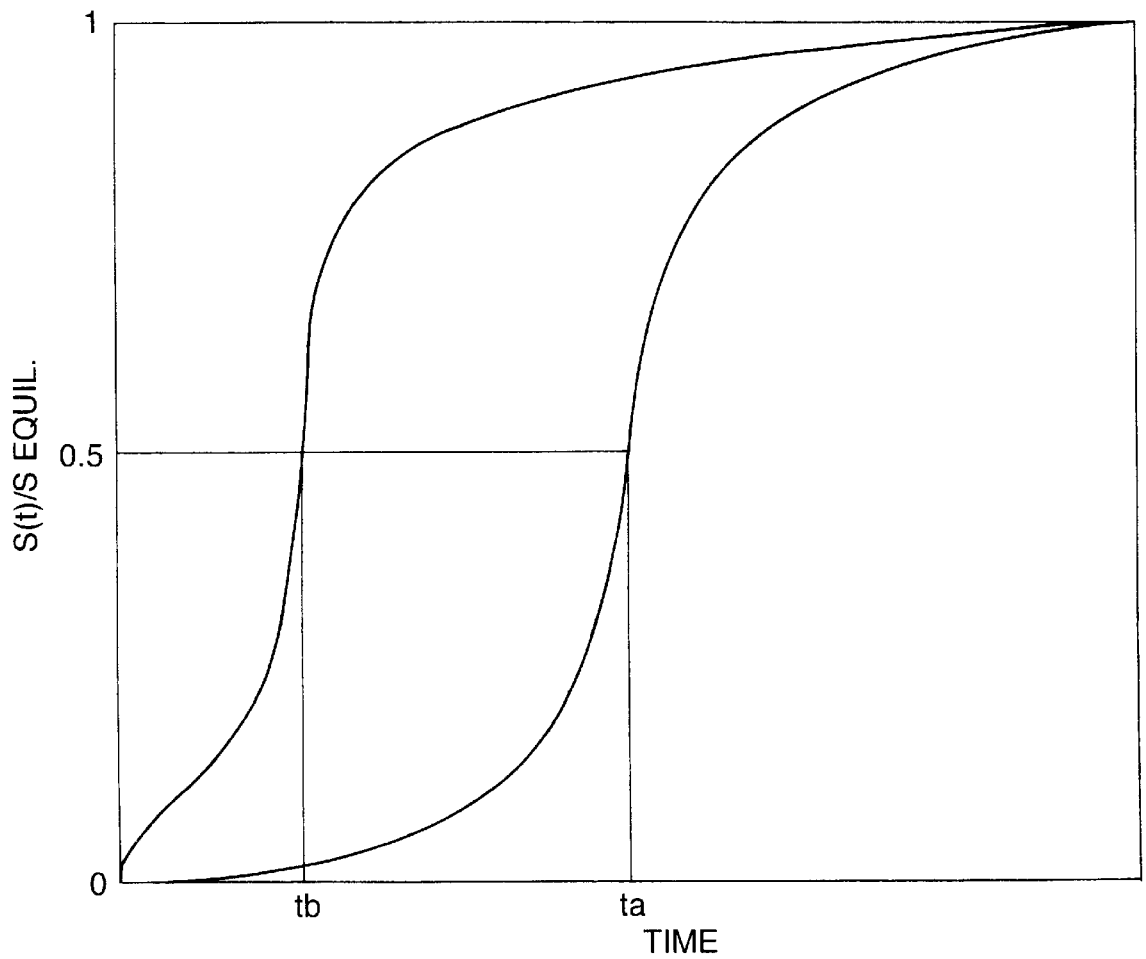
FIG. 1 schematically shows the relative increase of solid fat phase as a function of time in a slow crystallizing fat without (1a) and with (1b) accelerator.

The effectivity of the accelerator fat on the rate of crystallisation is determined by the X2M triglycerides. The effective X2M triglycerides of the found crystallization accelerator fat generally exhibit asymmetry in the molecule, because generally much more asymmetrical XXM triglycerides are present than symmetrical XMX triglycerides. Besides that, a minimum chain length difference between the longest and the shortest fatty acid chain of a particular triglyceride is required. This difference should be greater when the ratio of XXM/XMX becomes smaller. Generally, the difference is at least two carbon atoms, but when said ratio drops below 2.5 the difference in chain length should increase to at least six.

Preferably, the minimum chain length difference of six carbon atoms is already valid for all XXM/XMX<5, more preferably for all XXM/XMX<8, while for the remaining high XXM/XMX ratios the difference remains at least two carbon atoms.

Incorporation of such asymmetrically arranged triglycerides into a supercooled fat blend has appeared to help overcoming slow crystallization, particularly of low-trans fats.

Although the minimum difference in chain length of the longest and the shortest chain must be two or six carbon atoms, depending on the XXM/XMX ratio of the triglyceride mixture, larger differences in chain length comprising four, six, eight or even ten carbon atoms are preferred.

The nature of the X and M chains does not matter, with the restriction that they should be saturated and that X chains should have more than 15 carbon atoms and M chains less than 15.

The meaning of the relative term "slow" will be appreciated when considering the practical requirements of product processing. The need for sufficiently fast fat crystallization is most critical in the manufacture of stick (wrapper) margarines. The packing machine can handle only firm bars of solidified margarine emulsion. During subsequent storage the piled up margarine packs need to stand a considerable pressure. If not, oil exudation occurs and packs will collapse when their content is insufficiently solidified. In the manufacture of tub margarines slow crystallization causes that the emulsion spatters and spills over the container rim. The present way to cope with slow crystallizing margarine fats is to slow down operations, or by conducting the solidifying emulsion through a larger B-unit, a resting tube which allows the emulsion a longer residence time for crystallization before it enters the packing machine. The undesired consequence is that either the throughput of the margarine factory is reduced or extra equipment (additional B-unit volume) is needed or both.

In the context of the present specification a fat is defined "slow" when without added accelerator and left at 10° C. to quiescent crystallization, it needs at least 15 minutes to have crystallized 50 wt. % of the solid phase content which is present in the equilibrium stage at 10° C.

Fat crystallization is said to have attained equilibrium stage when at the relevant temperature the increase of solid fat content per minute is less than 0.01 wt. %. In the fat to be crystallized is not comprised the solid fat which was already present in the supercooled sample when starting measuring solid fat content.

The time needed for attaining said 50 wt. % crystallization level is defined as the half-time for crystallization. The longer the half-time the slower the fat crystallizes. The invention is particularly relevant for fats having a half-time of at least 30 minutes and is much beneficial for fats having a half-time of at least 45 minutes.

FIG. 1 schematically shows the relative increase of solid fat phase as a function of time in a slow crystallizing fat without (1a) and with (1b) accelerator. The crystallization rate initially increases and later slows down until equilibrium is reached.

The found crystallization accelerating effect of the X2M triglycerides is very general and has manifested itself with several types of slow crystallizing fats, and particularly with oils which have a relatively low (less than 10 wt. %) content of trans fatty acids or which are even substantially trans-free. Palm oil may benefit from the present invention because it is an example of a notoriously slow crystallizing fat (cfr. J. Am. Oil Chemists Soc. 62, 1985, 408–410). Further examples are palm mid-fraction, interesterified mixtures of seed oils and fully hardened seed oils and fat blends which contain a substantial part of these oils. GB 2292949 describes several examples of slow crystallizing fats.

The triglycerides which show crystallization accelerating properties, so-called effective triglycerides, need to be present in the accelerator fat in an effective amount.

When the weight ratio of XXM and XMX triglycerides (XXM/XMX) is at least 5, the effective amount of X2M triglycerides is at least 15% of the accelerator fat. For lower ratios the effective amount of said triglycerides should be at least 10 wt. % of the accelerator fat. Preferably the minimum amount of 15 wt. % applies for all XXM/XMX ratios being at least 2.5.

Preferably the amount of all X2M triglycerides in the accelerator fat is at least 20 wt. %, more preferably at least 25 wt. %, still more preferably at least 30 wt. %, and even more preferably at least 35 wt. % of the accelerator fat.

The accelerating effect on fat crystallization is observed by merely having blended the crystallization accelerator of the invention into the slow crystallizing supercooled fat in a weight ratio of 0.5 wt. % to 10 wt. %, preferably 0.5 wt. % to 6 wt. % on total fat blend.

Use of more crystallization accelerator is possible, of course, but does not necessarily give better results and may even adversely affect the properties of the eventual fat blend. Generally, an amount lesser than 0.5 wt. % appears to be not effective.

The invention has shown that also crystallization accelerators with a low content of trans fatty acids are able to act as accelerators of fat crystallization.

A preferred crystallization accelerator according to the present invention is fully hardened high lauric rapeseed oil (fhHLRP). This fat is disclosed in WO 95/30336 where it is used as part of a liquid oil blend. This blend, however, does not suffer from slow crystallization, to the contrary, said liquid oils are supposed to remain liquid at 10° C. as part of a spread fat phase. At that time the special crystallization accelerating behaviour of fhHLRP was therefore not recognized.

Another suitable crystallization accelerator has been found to be fully hardened butter fat (fhBU) which as such is a known fat, but which was never mentioned before in admixture with a slow crystallizing fat.

Another effective accelerator is butter fat interesterified with fully hardened soybean oil.

The invention is further exemplified by the following examples:

GENERAL

Fats are characterized by a so-called N-line representing for each fat temperature the solid fat content (N-value). In this specification N-lines are expressed by their N-values, essentially as defined in Fette, Seifen, Anstrichmittel (1978), 80, 180–186, with due modification as to temperature stabilisation: the samples were stabilized at 0° C. for 16 hours and tempered as described for 0.5 h at the respective measuring temperatures.

The analytical and calculation methods used in this description and claims for determining the amount of X2M triglycerides as well as the ratio XXM/XMX are well known in the art. For instance, using GLC for the fatty acid analysis in combination with 2-position analysis using partial hydrolysis of the 1,3-positions of the triglycerides and the 1,3-random distribution assumption (Coleman, M. H. and Fulton, W. C., 5th Int. Conf. Biochem. Problems of Lipids, Pergamon Press, London (1961)). Suitable analytical methods are described for example in EP 78568 (FAME analysis), F. D. Gunstone et al, The Lipid Handbook, 2nd edition, (1994), Chapman & Hall, London, pages 335–338 (FAME and 2-position analysis) and A.O.C.S. Official Method Ch 3–91, 1–4 (2-position analysis).

Only for fully hardened butterfat, of which it is generally known that it does not fulfill the 1,3 random distribution assumption (F. D. Gunstone et al, The Lipid Handbook, 2nd edition, (1994), Chapman & Hall, London, page 147), the positional distribution of the major fatty acids had to be determined using Brockerhoff's method (Brockerhoff, H., J. Lipid Res. (1965) 6, 10).

EXAMPLES 1–3

General

In order to illustrate the present invention fat blends were prepared of which the compositions are shown in Table I. These blends were chosen such, that they contained all 2% X3 triglycerides, about 25% of the main triglyceride (SOS, SSO or POP) and further only liquid oils (see Table II for analysis). Mono and diglyceride content were kept constant, (mono: 0.1%, di:1–2%) as this could otherwise have affected the properties of the fat blend.

The N-lines of these reference blends and the N-lines of the same reference blends but admixed with accelerator fats are all in the range of blends suitable for margarine and other edible spread manufacture with typical values for N10: 20–40, and for N35: 0–4.

For the blends 'SOS', 'SSO' and 'POP' N-lines and triglyceride compositions are given in Table II (N-lines and triglyceride composition) and Table I (composition of fat blend). The triglyceride composition was determined by the method as described in JAOCS (1991), 68(5), 289–293 (Silverphase HPLC).

TABLE I

Composition of three slow crystallizing reference fat blends characterized by main triglyceride SOS, SSO or POP

| SOS | 0.5% | Fully hardened sunflower (m.p. 69° C.) |
|---|---|---|
| | 29% | Dry fractionated shea stearin |
| | 5% | Solvent mid-fraction of (in(40SF69/60OV)) |

TABLE I-continued

Composition of three slow crystallizing reference fat blends characterized by main triglyceride SOS, SSO or POP

|     |       |                                              |
| --- | ----- | -------------------------------------------- |
|     | 19%   | Solvent foot-fraction of (in(40SF69/60OV))   |
|     | 46.5% | Sunflower oil                                |
| SSO | 0.5%  | Fully hardened sunflower (m.p. 69° C.)       |
|     | 3%    | Dry fractionated shea stearin                |
|     | 35%   | Solvent mid-fraction of (in(40SF69/60OV))    |
|     | 5%    | Solvent foot-fraction of (in(40SF69/60OV))   |
|     | 56.5% | Sunflower oil                                |
| POP | 32%   | Solvent mid-fraction of palm oil             |
|     | 18%   | Solvent foot-fraction of palm oil            |
|     | 50%   | Sunflower oil                                |

S = stearic acid, P = palmitic acid, O = oleic acid in (40SF69/60OV) means an interesterified mixture of 40% fully hardened sunflower oil (slip melting point 69° C.) and 60% olive oil.

Synthetic X2M triglycerides containing fats had a X2M percentage of more than 85 wt. %, mostly even more than 90 wt. %. They are denoted as a.b.c where a, b, c indicate the chain lengths of the fatty acids.

According to the following examples these triglycerides are admixed with the above reference blends.

TABLE II

Slow crystallizing fat blends characterized by main triglyceride SOS, SSO or POP

| | | N-lines | | | | | triglyceride-compositions | | |
| --- | --- | --- | --- | --- | --- | --- | --- | --- | --- |
| | | | | | | | | XOO + | |
| Main | N10 | N20 | N30 | N35 | X3 | XOX | XXO | X2Li | Rest |
| SOS | 37.9 | 22.6 | 4.4 | 1.7 | 2 | 25 | 4 | 19 | 50 |
| SSO | 37.4 | 23.6 | 5.0 | 0.8 | 2 | 11 | 17 | 13 | 57 |
| POP | 25.7 | 5.7 | 0.2 | 0.0 | 2 | 24 | 4 | 17 | 53 |

X refers to C > 15 saturated fatty acids, Li = linoleic acid, O = oleic acid

The half-time of crystallization was determined with isothermal crystallization using the following experimental procedure. The molten fat blend was drawn from a 100 g premix vessel and conducted through a microvotator A-unit (surface-scraping heat exchanger) operating at a throughput of about 10 kg/hr (2.78 g/s). A-units are commonly employed for (super)cooling fat blends and emulsions in spreads manufacture. Subsequent to passage through the A-unit, non-further processed fat blend was remelted in a small tube heat exchanger and recycled into the premix vessel. This cycling system provided a continuous supply of supercooled fat from the A-unit.

For measurement a sample was drawn from the A-unit into an NMR-tube. The tube was placed into a thermostated pulse NMR measuring equipment and measurements of solids content were taken at 5–15 second intervals under the supervision of a computer program (in BASIC on Hewlett Packard 200–300 series computer). Tests showed that during crystallization the sample temperature in the NMR tube remained constant at 10° C. within 0.5° C. The solids/time curve was used to determine the half-time for crystallization.

EXAMPLE 1

The following results were obtained for the reference POP blend (tables I and II) to which various synthetic X2M triglycerides a.b.c were added:

| POP-blend | crystallization half-time |
| --- | --- |
| pure | 1430 sec |
| +2% and 5% 16.16.14 | 495 and 425 sec |
| +2% and 10% 16.16.12 | 733 and 267 sec |
| +2% and 5% 18.18.12 | 1410 and 735 sec |
| +2% and 10% 16.14.16 | 2010 and 1165 sec |

The rate of crystallization of the POP basic blend is significantly accelerated by the addition of asymmetric X2M triglycerides. The symmetric 16.14.16 triglyceride with a chain length difference between the longest and the shortest fatty acid of only 2 is not very effective, not even at a level of addition of 10%. At 2% addition 16.14.16 even decreases the rate of crystallization which results in a half-time which is longer than that of the reference blend.

EXAMPLE 2

The following results were obtained for the reference SOS blend (described in tables I and II) to which two synthetic X2M triglycerides were added:

| SOS-blend | half-time |
| --- | --- |
| pure | 1000 sec |
| +2% and 5% 16.14.16: | 765 and 665 sec |
| +2% and 5% 18.12.18: | 500 and 310 sec |

The figures show that also symmetric X2M triglycerides accelerate the crystallization rate of the SOS reference blend. However, their effectivity appears to depend much on the chain length difference between the longest and the shortest fatty acid. Clearly 18.12.18 with a chain length difference of 6, is much more effective than 16.14.16 with a chain length difference of only 2.

EXAMPLE 3

The following results were obtained for the reference SSO blend (described in tables I and II) to which two synthetic X2M triglycerides were added:

| SSO-blend | half-time |
| --- | --- |
| pure | 3960 sec |
| +2% and 5% 16.16.14: | 570 and 300 sec |
| +2% and 5% 18.18.12: | 2410 and 1250 sec |

The asymmetric X2M triglycerides appear to be very effective accelerators, even when used at a level of addition of only 2%.

EXAMPLES 4–7

Composition of reference fat:

| | |
| --- | --- |
| soybean oil | 50% |
| olein | 42% |
| hardened soybean oil (s.m.p. 42° C.) | 8% |
| trans | 3.2% |

The olein component was produced according to the process described in WO 96/14755:
 (1) randomly interesterifying a mixture consisting of 40% rapeseed oil and 60% fully hydrogenated soybean oil.

(2) dry fractionating the interesterified blend and collecting the olein having an N-line: N10=72.2, N20=52.7, N30=13.7, N35=6.0

TABLE IV

FAME analysis of olein

| | |
|---|---|
| 14:0 | 0.1 |
| 16;0 | 7.9 |
| 16:1 | 0.1 |
| 17:0 | 0.1 |
| 18:0 | 42.5 |
| 18:1 | 31.1 |
| 18:2 | 11.1 |
| 18:3 | 4.9 |
| 20:0 | 0.6 |
| 20:1 | 0.7 |
| 22:0 | 0.4 |
| 22:1 | 0.1 |
| 24:0 | 0.1 |
| 24:1 | 0.1 |

To 1000 g of this reference blend the following crystallization accelerator fats were added, each derived from modified natural fats:

Example 4: 35 g fully hardened butter fat

Example 5: 80 g fully hardened butter fat

Example 6: 25 g fully hardened high lauric rapeseed oil

Example 7: 50 g of a randomly interesterified mixture of 70% butter fat and 30% fully hardened soybean oil The accelerator fats are characterized in table III by their fatty acid methyl esters (FAME) analysis and in tables V and VI by amounts of XXM and XMX triglycerides, symmetry ratio of the X2M triglycerides and by percentage (calculated on accelerator fat) of effective triglycerides (denoted as $X^* -M$, where $X^*$ is the fatty acid with the longest chain length) within the above crystallization accelerating fats.

TABLE III

FAME analysis of accelerator fats

| | fh butter fat | fh high lauric rapeseed oil | interesterified mixture |
|---|---|---|---|
| 4:0 | 3.2 | — | 2.1 |
| 6:0 | 2.1 | — | 1.4 |
| 8:0 | 1.3 | — | 0.9 |
| 10:0 | 3.2 | 0.1 | 2.0 |
| 12:0 | 4.5 | 34.7 | 3.0 |
| 14:0 | 12.2 | 3.7 | 7.9 |
| 14:1 | — | — | 0.8 |
| 15:0 | 1.2 | — | 0.8 |
| 16:0 | 32.7 | 4.5 | 24.8 |
| 16:1 | — | — | 1.3 |
| 17:0 | 0.8 | — | 0.4 |
| 17:1 | 0.1 | — | 0.3 |
| 18:0 | 32.6 | 54.2 | 33.1 |
| 18:1 | 0.2 | 0.2 | 14.1 |
| 18:2 | 0.1 | 0.1 | 1.1 |
| 18:3 | 0.3 | 0.1 | 0.8 |
| 20:0 | 0.7 | 1.4 | 0.3 |
| 20:1 | — | — | 0.1 |
| 22:0 | 0.9 | 0.4 | 0.9 |
| 22:1 | 0.4 | — | 0.2 |
| 24:0 | 1.3 | 0.2 | 1.5 |
| others | 2.2 | 0.4 | 2.2 |

TABLE V

| | XXM | XMX | XXM/XMX | $(X^* - M) \geq 2$ |
|---|---|---|---|---|
| fully hardened butter fat | 30.7% | 9.2% | 3.3 | 39.9% |
| fully hardened high lauric rapeseed oil | 42.1% | 0.4% | 105 | 42.5% |

TABLE VI

| | XXM | XMX | XXM/XMX | $(X^* - M) \geq 6$ |
|---|---|---|---|---|
| interesterified mixture of 70% butter fat and 30% fully hardened soybean oil | 15.9% | 7.9% | 2.0 | 15.1% |

TABLE VII

Half-times of crystallization

| Ref. blend 1000 g | Example 4 Ref. + 35 g fh butter fat | Example 5 Ref. + 80 g fh butter fat | Example 6 Ref. + 25 g fh HLRP | Example 7 Ref. + 50 g interest. mixture |
|---|---|---|---|---|
| 49 min | 43 min | 26 min | 24 min | 35 min |

The examples demonstrate a very significant reduction in the half-time of crystallization. Fully hardened butter fat is the least effective accelerator.

EXAMPLE 8

Composition of reference fat blend:

| | |
|---|---|
| soybean oil | 60% |
| olein (see examples 4–7) | 40% |

To 1000 g of this reference blend 50 g of the fully hardened high lauric rapeseed oil as used in Example 6 was added.

TABLE VIII

Half-time of crystallization

| Reference blend 1000 g | Example 8 Ref. + 50 g fh high lauric rapeseed oil |
|---|---|
| 70 min | 17 min |

In contrast to the ref. blend of Examples 4–7 the present reference blend is virtually trans-free, which results in a much slower crystallization of the reference blend. But addition of 5 wt. % of fully hardened high lauric rapeseed oil results in a very large reduction of the half-time to 17 min., which is much advantageous for commercial spread processing.

EXAMPLE 9

Composition of reference fat blend:

| | |
|---|---|
| palm oil | 60% |
| rapeseed oil | 40% |

To 1000 g of this reference blend 40 g of fully hardened high lauric rapeseed oil (Example 6) was added.

TABLE IX

| Half-time of crystallization | |
|---|---|
| Reference blend 1000 g | Example 9 Ref. + 40 g fh high lauric rapeseed oil |
| 19 min | 10 min |

Clearly the applied accelerator reduces the half-time also of a reference blend based on palm oil which demonstrates the generic nature of the accelerating effect.

EXAMPLES 10–11

MARGARINE MANUFACTURE

Three margarines were prepared with the fat blends as specified in table X. All blends had a trans content of 3.2 wt. % (GLC).

The olein, hardened soybean oil, fully hardened butter fat and fully hardened high lauric rapeseed oil were the same as applied in examples 4–7. The margarine fats containing accelerator fats had been optimized by adjusting the olein content so that the N35 value did not exceed a level of 2%.

Stick margarines were produced with the following composition using a pilot plant scale Votator with an A1-A2-C-A3-B sequence. Fat phase composition:

69.6 parts margarine fat of Table X
0.2 parts emulsifier
0.2 parts soybean phosphatides
p.m. colorant Aqueous phase composition:

26.79 parts water
1.25 parts whey powder
1.9 parts salt
0.06 parts potassium sorbate
p.m. citric acid to pH 4.7

TABLE X

| Margarine fat blend | | | |
|---|---|---|---|
| | Examp. ref. wt. % | Examp. 10 wt. % | Examp. 11 wt. % |
| refined soybean oil | 50 | 54.5 | 26 |
| refined rapeseed oil | — | — | 30 |
| olein | 42 | 34 | 33.5 |
| hardened soybean oil (s.m.p. 42° C.) | 8 | 8 | 8 |
| fully hardened butter fat | — | 3.5 | — |
| fully hardened high lauric rapeseed oil | — | — | 2.5 |
| Trans content (wt. %) | 3.2 | 3.2 | 3.2 |
| N10 | 38.4 | 34.8 | 34.1 |
| N20 | 18.5 | 16.0 | 17.2 |
| N30 | 3.8 | 4.0 | 4.0 |
| N35 | 1.4 | 1.7 | 1.9 |

The A-units operated at 600 rpm. Further processing as indicated in Table XI. Table XI shows the production and product parameters.

TABLE XI

| Margarine manufacture | | | |
|---|---|---|---|
| | Examp. Ref. | Examp. 10 | Examp. 11 |
| throughput (kg/hr) | 70 | 70 | 110 |
| C unit (rpm) | 300 | 100 | 100 |
| temperatures after A1, A2, A3 | 25, 6, 6 | 15, 8, 8 | 15, 8, 8 |
| solids ex A2-unit (%) | 15.6 | 11.1 | 10 |
| solids ex A3-unit (%) | 14.3 | 10.4 | 10.1 |
| residence time C-unit (sec) | 154 | 154 | 49 |
| residence time B-unit (sec) | 411 | 206 | 164 |
| hardness at packing (grams) | 129 | 114 | 165 |
| hardness after one week storage at 5° C. (grams) | 426 | 472 | 403 |

Hardness values, expressed in grams, were determined using a 4.4 mm diameter cylinder in a Stevens-LFRA Texture Analyzer (ex Stevens Advanced Weighing Systems, Dunmore, U.K.) load range 1000 g operated "normal" and set at 10 mm penetration depth and 2.0 mm/sec penetration rate.

Minimum hardness should be about 100 and preferably is 150.

The residence in the B-unit should be long enough that the hardness increase allows the product to be wrapped at packing. Else the product remains too soft and it cannot be properly packed. Unacceptable rounding of the corners of the pack would result. The packs would be unable to withstand the pressure of being stacked which would make palletizing impossible.

The effect of using fully hardened butter fat as accelerator is demonstrated by the fact that the residence time in the B-unit (resting tube) can be much shorter compared to the reference example. The applied B-unit had a volume of 4 liters whereas in the case of the reference blend a volume of 8 liters was required.

A product with sufficient consistency at packing resulted.

In accordance with Examples 4 and 6 the accelerating effect of fully hardened high lauric rapeseed oil is even larger than with fully hardened butter. Here not only a smaller residence time in the B-unit is sufficient, also the residence time in the C-unit (crystallizer) can be much shorter and, most importantly, the throughput can be increased from 70 to 110 kg/hr. This would correspond with an increase of the production volume of almost 60%. Ideally, throughput is 120 kg/hr. Despite the smaller residence time in the B-unit and the increased throughput the hardness at packing is significantly higher than in both other examples.

Figure 2:
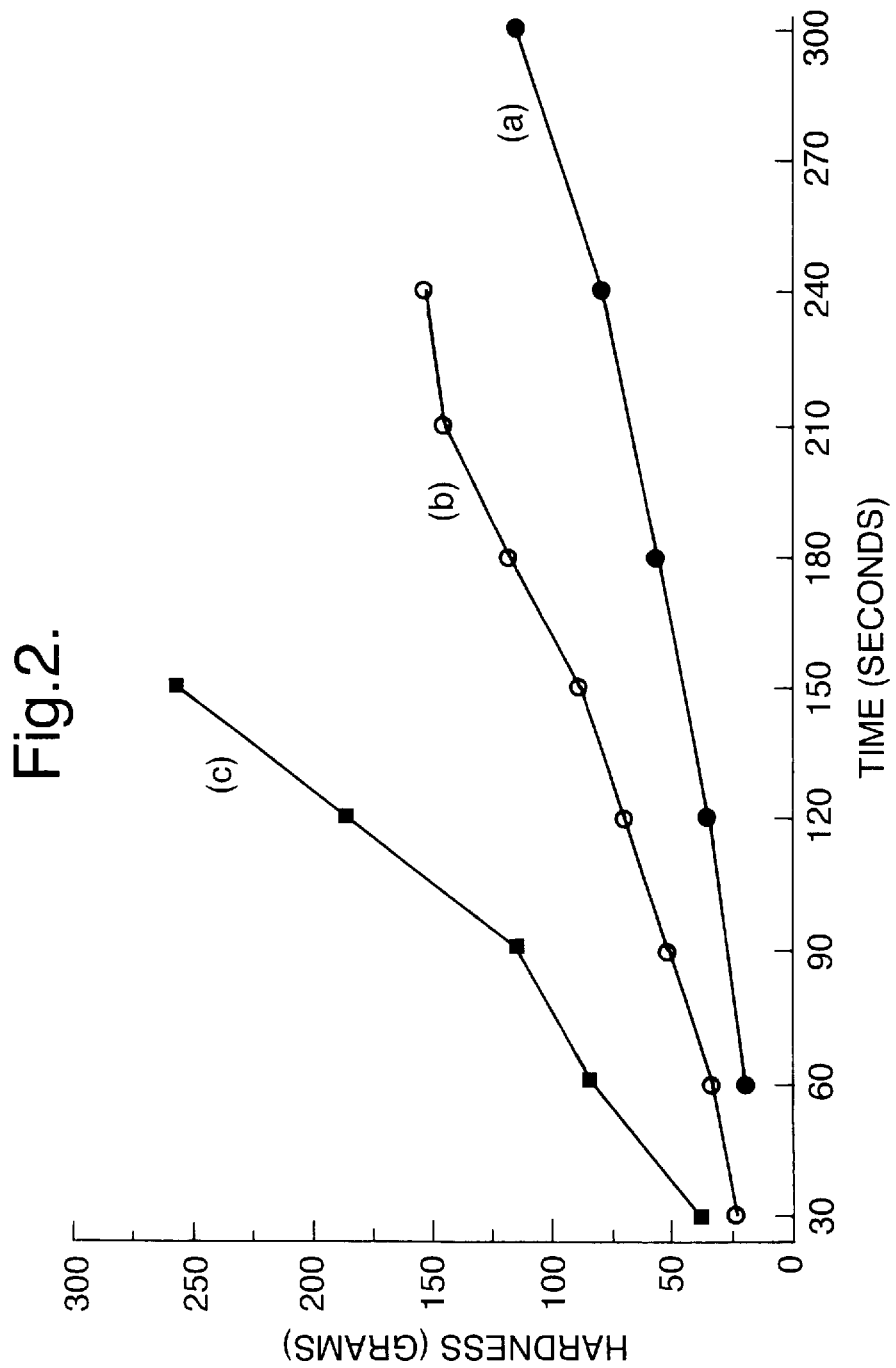
FIG. 2 demonstrates the effect of the addition of fully hardened butter fat (line b) and fully hardened rapeseed oil (line c) on the rate of hardness increase in comparison with the reference blend without accelerator (line a).

To get an impression of the necessary B-unit volume, samples were drawn from the line just before the B-unit. These samples were left to further quiescent crystallization. Hardness was measured as a function of time during 300 seconds. FIG. 2 clearly demonstrates the effect of the addition of fully hardened butter fat (line b) and especially of fully hardened high lauric rapeseed oil (line c) on the rate of hardness increase, in comparison with the reference blend without accelerator (line a). In the presence of the accelerators of the present invention crystallization proceeds faster, so that the residence times in the B-unit can be kept within normal limits and nevertheless the product can be properly wrapped.

We claim:

1. Slow crystallizing margarine fat consisting of triglycerides blended with 0.5 to 10 wt. % crystallization accelerator, which crystallization accelerator consists of a mixture of triglycerides having fatty acid carbon chains of different chain lengths, where saturated chains with C>15 are denoted as X and saturated chains with C<15 as M, which mixture comprises triglycerides of the type XXM and triglycerides of the type XMX (together denoted as X2M), where, when the XXM/XMX weight ratio is at least 2.5, the crystallization accelerator contains at least 15 wt. % of X2M triglycerides of which the longest chain differs from the shortest chain by at least two carbon atoms and when the XXM/XMX weight ratio is<2.5, the crystallization accelerator contains at least 10 wt. % of X2M triglycerides of which the longest chain differs from the shortest chain by at least six carbon atoms.

2. Fat blend, according to claim 1 where for XXM/XMX <5 the minimum chain length difference is six carbon atoms while for the remaining XXM/XMX ratios the difference is at least two carbon atoms.

3. Fat blend according claim 1 where, when the XXM/XMX ratio is at least 2.5, the crystallization accelerator contains at least 15 wt. % of X2M triglycerides of which the longest chain differs from the shortest chain by at least four carbon atoms and when the XXM/XMX ratio is<2.5, the crystallization accelerator contains at least 10 wt. % of X2M triglycerides of which the longest chain differs from the shortest chain by at least eight carbon atoms.

4. Fat blend according to claim 1 containing a slow crystallizing fat for which the half-time for crystallization at 10° C. is at least 15 minutes.

5. Fat blend according to claim 1, in which the crystallization accelerator is fully hydrogenated high lauric rapeseed oil.

6. Fat blend according to claims 1, which contains the crystallization accelerator fat in a weight ratio of 0.5–6 wt. %.

7. Fat blend according to claim 1 where for any XXM/XMX ratio the effective amount of X2M triglycerides is at least 20 wt. % of the accelerator fat.

8. Method for accelerating the crystallization of a slow crystallizing triglyceride fat by incorporating in the fat a triglycerides mixture as characterized in claim 1.

9. Method according to claim 8, where the slow crystallizing fat is chosen from the group consisting of palm oil and its fractions, interesterified blends of seed oils and fully hardened seed oils and fractions of these interesterified blends.

* * * * *